J. R. McGIFFERT.
BRAKE MECHANISM.
APPLICATION FILED OCT. 26, 1910.
1,026,274.
Patented May 14, 1912.
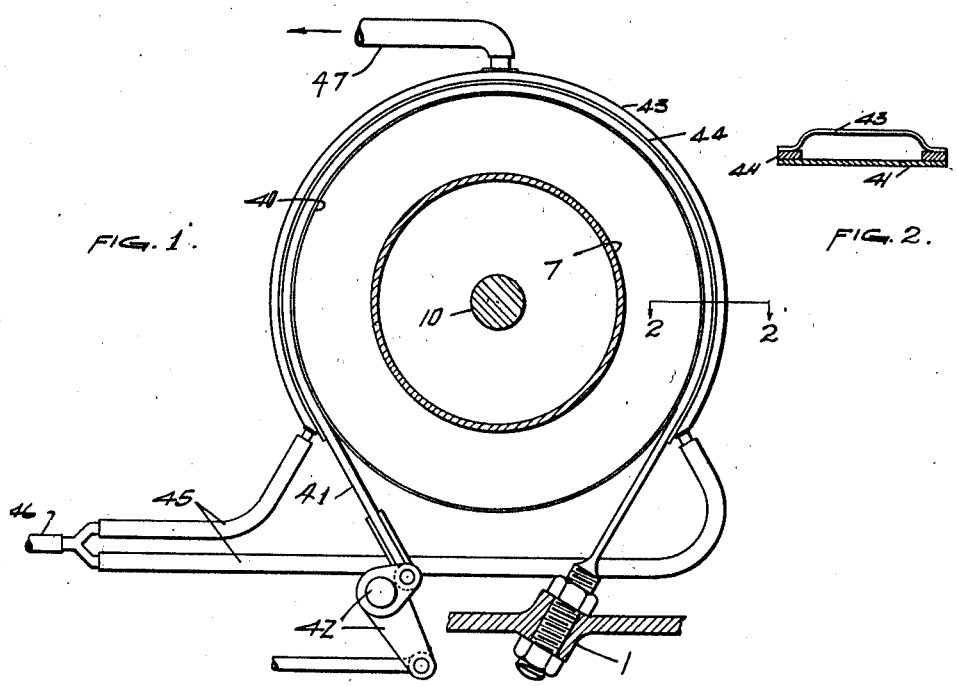

UNITED STATES PATENT OFFICE.

JOHN R. McGIFFERT, OF DULUTH, MINNESOTA, ASSIGNOR TO CLYDE IRON WORKS, OF DULUTH, MINNESOTA, A CORPORATION OF MINNESOTA.

BRAKE MECHANISM.

1,026,274.  Specification of Letters Patent.  Patented May 14, 1912.

Application filed October 26, 1910. Serial No. 589,218.

*To all whom it may concern:*

Be it known that I, JOHN R. McGIFFERT, a citizen of the United States, and a resident of Duluth, county of St. Louis, and State of Minnesota, have invented a new and useful Improvement in Brake Mechanism, of which the following is a specification, the principle of the invention being herein explained and the best mode in which I have contemplated applying that principle, so as to distinguish it from other inventions.

In certain machines, such as hoisting and excavating machines, it is necessary to provide very powerful brakes in order to safely handle the load in its different positions. In the operation of such brakes, a serious difficulty arises in that an immense amount of heat is generated by friction brakes of capacity adequate for the service demanded, so that with constructions, such as are found in prevailing forms of hoisting mechanism, the machine can only be operated for a short time without stopping in order to cool off the drum and the brake mechanism.

The general object of this invention is to overcome the difficulty mentioned.

The annexed drawings and the following description set forth in detail certain mechanism embodying the invention such disclosed means constituting, however, but one of various mechanical forms in which the principle of the invention may be used.

In said annexed drawings:—Figure 1 is a side elevational view of mechanism embodying my invention; and Fig. 2 is a transverse sectional view of the brake-band on the line 2—2 in Fig. 1.

The shaft to be controlled is represented at 10 and bears a drum 7 provided with a suitable braking surface. Such surface, it will be understood is covered with suitable friction material, preferably asbestos friction board 40 (see Fig. 5), which is riveted to the metal face of the drum proper. Encircling such surface is the brake-band 41 shown in detail in the same Fig. 5, just referred to. This band preferably consists of a steel strap securely attached at its one end to a portion of the engine frame 1 and at the other to an ordinary brake rocker 42 which may be operated in the usual fashion either from a hand or foot lever (not shown). On the outside of the band 41, I attach a thin, pressed plate 43 of the cross section form clearly appearing in Fig. 2, the practical mode of such attachment being to rivet said plate to the main band along its lower edges, strips of asbestos packing 44 being inserted between the plate and the band in order to make the joint water-tight. An annular chamber is thus formed on the outer face of the band, its walls by virtue of the construction just described being sufficiently flexible to enable such chamber to accommodate itself to the slight movement involved in the alternate contraction and expansion of the band. At the two lower extremities of the chamber thus formed, hose connections are provided to which are attached the ends of two sections 45 of hose, or like flexible supply conduits, that are conveniently joined into one common supply pipe 46 at a proper distance from the connections in question. Another similar hose connection is provided in the center of the chamber, or in other words, at its highest part to which a similar flexible conduit 47 is attached. This latter conduit extends to the top of the water-tank from which the water is drawn for the boiler of the engine, while the lower hose connection is run to the lower part of such tank. By this means, cold water may be circulated through the chamber upon the band, coming in at the bottom at each end thereof and passing off through the hose that leads from its uppermost point. In this way the band is cooled so as to avoid the excessive heating effects to which reference has been previously made.

Ordinarily the heat that will be developed frictionally from the necessary application of the brake band will heat the water sufficiently to cause a proper circulation thereof, although a small pump in either the supply or discharge line from the chamber attached to said band, may be utilized and the circulation thus made positive. Incidentally it will be observed that this device, while it serves as a cooling means for the brake band also serves as a hot water heater for the boiler; for as stated, the tank from which the water is drawn for the cooling of the band, and to which it is thereupon returned, also serves to feed said boiler. The heat developed and thus conserved in the operation of a machine of any considerable size is very large in amount, and the heating of the feed water thus secured, a very effective element in the economical running of the same. I should further remark that by using asbestos on the friction surface to which the band 41 is applied, the drum itself is heat insulated and the heat that is generated when the band is applied is thus all the more readily carried off through the band and the cooling current of water circulated around the same.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the class described, the combination of a drum; a flexible brake band therefor; means for flexing said band; a chamber substantially co-extensive with the band provided on the outer face of said band; and means for circulating a cooling fluid through said chamber.

2. In mechanism of the class described, the combination of a drum; a flexible brake band therefor, said band having its two ends directed downwardly; means for flexing said band; a chamber, substantially co-extensive with said band, provided on its outer face; a bifurcated connection for supplying water to such chamber at its respective ends; and another connection for withdrawing water from approximately the highest part of said chamber.

3. In mechanism of the class described, the combination of a drum; a flexible brakeband therefor; means for flexing said band; a chamber substantially co-extensive with the band provided on the outer face of said band; heat insulating material disposed on the surface of said drum designed for the application of said band; and means for circulating a cooling fluid through said chamber.

4. In mechanism of the class described, the combination of a drum; a flexible band therefor, said band having its two ends directed downwardly; means for flexing said band; a chamber substantially co-extensive with said band, provided on its outer face; a bifurcated connection for supplying water to such chamber at its respective ends; another connection for withdrawing water from approximately the highest part of said chamber; and heat insulating material disposed on the surface of said drum designed for the application of said band.

Signed by me this 18th day of October, 1910.

JOHN R. McGIFFERT.

Attested by—
 ANNA L. GILL,
 JNO. F. OBERLIN.